May 29, 1956 — T. C. JENKINS — 2,747,289
ENGINE INDICATOR PROBE
Filed March 25, 1954
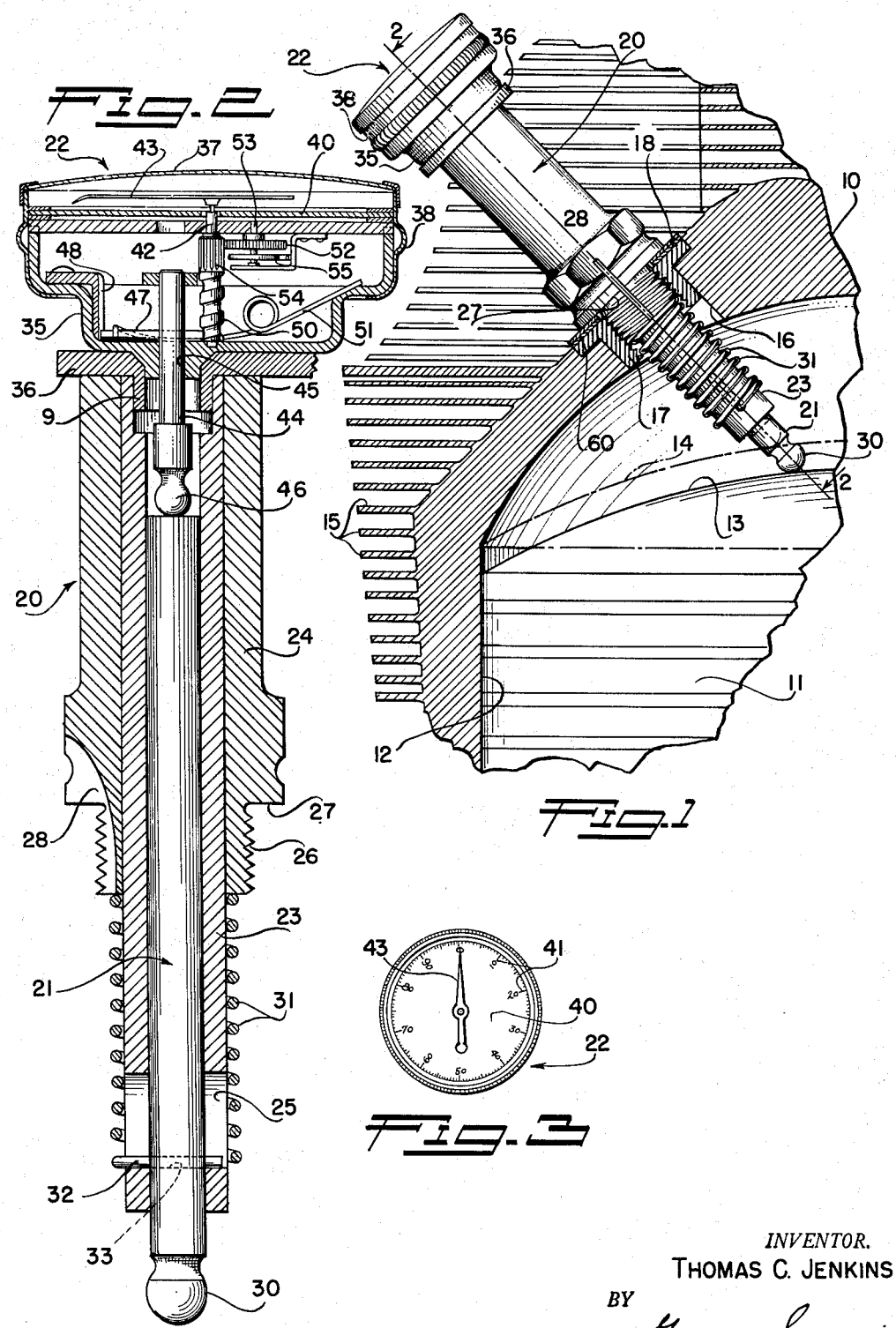
INVENTOR.
THOMAS C. JENKINS

United States Patent Office 2,747,289
Patented May 29, 1956

2,747,289

ENGINE INDICATOR PROBE

Thomas C. Jenkins, Altadena, Calif., assignor to Lockheed Aircraft Corporation, Burbank, Calif.

Application March 25, 1954, Serial No. 418,732

1 Claim. (Cl. 33—172)

This invention relates to cylinder probes for reciprocating engines and relates more particularly to indicating devices or probes useful in determining the condition of the connecting rods of such engines.

In the initial running up and testing of engines, particularly aircraft cylinder and piston engines, one or more connecting rods may become bent due to what is termed "liquid lock." Any such bending of the connecting rods from liquid locks or other causes constitutes a potentially highly dangerous condition that may ultimately lead to engine failure during flight. Heretofore there has been no adequate or effective way of determining whether the connecting rods, or any of them, are bent and even though an engine is thoroughly and methodically inspected such a faulty condition may not be discovered and an engine is sometimes put into actual use in a faulty highly dangerous condition. Even after extensive engine usage incipient connecting rod failures may develop and at present there are no available means for determining this condition.

It is a general object of this invention to provide a simple, practical and dependable probe or device operable to readily determine or indicate the presence of bent or defective connecting rods without the necessity of disassembling the engine.

Another object of the invention is to provide a device or probe of this kind that is operable to indicate or ascertain whether the individual connecting rods of a multi-cylinder engine are of the proper length. The probe or device serves to indicate the top stroke position of the several individual pistons of the engine and from these indications or readings it is immediately apparent if any of the connecting rods are bent or distorted to the extent that they are dangerous and unsuitable for use.

A further object of the invention is to provide a device of this kind that does not require disassembling of the engine. The probe is merely installed in the spark plug openings of the cylinders and the crankshaft of the engine is turned or rotated so that the device may give visual readings or indications of the top dead-center positions of the individual pistons.

A still further object of the invention is to provide a device of the character described that is simple, compact and light weight and that does not require electrical connections or the employment of other powers means for its operation.

Other objectives and features of the invention will become apparent from the following detailed description of a typical preferred embodiment illustrated in the accompanying drawings in which:

Figure 1 is a fragmentary detailed sectional view of a portion of an engine illustrating the probe or device of the invention installed in the operative position in the spark plug opening of the same, the probe appearing in side elevation;

Figure 2 is an enlarged longitudinal detailed sectional view of the probe or device taken substantially as indicated by line 2—2 on Figure 1 with certain parts appearing in elevation; and Figure 3 is a reduced face or plan view of the calibrated dial and needle of the probe.

In Figure 1, I have shown a portion of a typical aircraft engine including a cylinder head and a piston 11 operating in the cylinder 12 of the engine. The piston 11 has an upper end surface 13 which, in the particular case indicated, is curved or convex. The broken line 14 in Figure 1 indicates the top deadcenter position assumed by the piston head surface 13 when the piston 11 reaches the upper end of its stroke, assuming the related connecting rod, not shown, to be normal and in the unbent condition. The cylinder head 10 is provided with the usual heat radiating or cooling fins 15 and has the conventional spark plug opening 16. In accordance with the usual practice this spark plug opening 16 has a sleeve or bushing 17 internally threaded for the reception of the spark plug, not shown, and provided at its upper or outer end with a machined outer surface 18. This surface 18 is accurately machined and its position and angular relation are very precise with respect to the axis of rotation of the crankshaft, the cylinder block mounting face, etc. so as to bear a known relation to the connecting rod and the piston stroke, the engine manufacturer being obliged to take considerable care in the machining of this surface 18 in order to assure the proper installation and positioning of the spark plug when the same is screwed in the bushing 17.

The probe or device of the invention, illustrated in detail in Figure 2, includes a tubular body 20 adapted to be threaded in the spark plug bushing 17, a probe stem 21 slidable in the body 20 and a lineal indicator 22 on the outer end of the body 20 actuated by the stem.

The body 20 is a tubular unit adapted to be screwed into the bushing 17 to extend into the cylinder 12. While I have shown the body 20 constructed of an inner member 23 and an outer member 24, it is to be understood the body may be of one-piece construction. The inner body member 23 is a simple tubular part provided at its inner end portion with a transverse elongate slot 25. The outer body member 24 has an externally threaded boss 26 of reduced diameter at its inner or lower end adapted to be screwed into the spark plug bushing 17. An annular downwardly facing shoulder 27 is provided on the body member 24 at the upper end of the boss 26 to bear or seat against the cylinder head face or bushing face 18. The lower portion of the member 26 is polygonal for ready engagement by a wrench. The inner body member 23 is force-fitted or otherwise secured in the outer member 24 and extends downwardly beyond the lower end of the threaded boss 26 so as to project some distance into the cylinder 12 when the probe is in its operative position in the bushing 17. A notch or slot 28 is preferably provided in the lower end portion of the outer body member 24 to extend longitudinally through the boss 26 and shoulder 27. This slot 28 constitutes an air bleed to permit free movement of air into and out of the cylinder 12 when the probe is in its operative position in the bushing 17 and the piston 11 is operated or moved in the cylinder.

The stem 21 is a simple elongate rod-like part freely slidable longitudinally in the tubular body 20. The upper end of the stem 21 may be flat and is spaced some distance below the upper end of the body 20. The stem 21 is sufficiently long to extend a short distance beyond the lower end of the body 20, that is beyond the lower end of the member 23, and the lower extremity of the stem may have a substantially hemispherical head 30. This head 30 is engaged by the top surface 13 of the piston 11 when the piston moves upwardly in the cylinder 12. The invention provides means for yieldingly urging the stem 21 to the position illustrated in Figure 2 where it extends from the lower end of the body 20 and for returning the stem to this position subsequent to operation or upward displacement by the piston. This means includes a coiled or spiral spring 31 having an end finger 32 at its lower end extending through the above described slot 25 and through an opening 33 in the stem 21. The upper end of the spring 31 bears against the lower end of the body boss 26 and the spring is under compression so as to yieldingly urge the stem 21 downwardly to the position shown in Figure 2 where the spring finger 32 engages the lower end of the slot 25. It will be observed that the spring finger 32, engaged in the slot 25 and opening 33, serves to hold the stem 21 against rotation or angular movement and by engagement with the ends of the slot serves to limit the longitudinal movement of the stem.

The indicator 22 is secured on the outer or upper end of the body 20 and is actuated by the stem 21 to visually indicate the extent or limit of upward travel of the piston 11. The indicator 22 has a case 35 secured on a mounting plate 36 which, in turn, is secured on the outer end of the body 20. In the particular construction illustrated the plate 36 has a tubular mounting boss 9 fixed in the upper end of the tubular body member 23. A transparent glass cover or crystal 37 extends across the upper end of the case 35 and is carried by a sleeve 38 which is manually turnable on the case. This sleeve 38 also carries a calibrated dial 40 readily visible through the crystal 37 and having calibrations 41 spaced circumferentially around its marginal area indicating micro-inches or other lineal measurements (see Figure 3). A rotatable shaft 42 is mounted in the case 35 and carries a needle or pointer 43 operable across the dial 40 to cooperate with the calibrations 41. By manually turning the sleeve 38 the dial 40 may be set or adjusted rleative to the pointer 43.

The means for operating or rotating the pointer 43 of the indicator 22 includes a stem or rod 44 slidable in an opening 45 in the lower wall of the case 35 to extend downwardly into the body 20. The lower end of the rod 44 has a hemispherical head 46 engaging the upper end of the probe stem 21. A pin 47 passes transversely through the rod 44 and has one end guided in a straight slot 48 in the case 35. The opposite end of the pin 47 engages a heavy thread or helix 50 on the lower portion of the pointer shaft 42. It will be seen that upon longitudinal movement of the rod 44 the pin 47 cooperating with the helix 50 causes the pointer shaft 42 to turn or rotate. A torsional spring 51 has one end anchored on the pin 47 and has its other end bearing downwardly against the wall of the indicator case 35. The spring 51 urges the rod 44 downwardly to remain in cooperation with the probe stem 21 at all times and serves to return the rod and the various elements of the indicator 22 including the pointer 43 to their normal or original positions following use of the device. An idler gear 52 is carried on a rotatable shaft 53 within the case 35 and meshes with a pinion 54 on the pointer shaft 42. The torsional hairspring 55 acts on the shaft 53 to stabilize the pointer 43, to reduce backlash, etc., this being common in lineal indicators of this general class.

In Figure 1, I have shown shims 60 engaged between the surface 18 of the spark plug bushing 17 and the shoulder 27 of the probe. Such shims 60 may be useful or necessary to adapt the device or probe for use with given or special engines to obtain the proper relationship between the top extremity of piston travel indicated by the line 14 and the head 30 of the probe stem 21. Such shims will not usually be required and the probe is normally installed to have the shoulder 27 bear directly on the surface 18.

In using the device or probe of the invention the boss 26 is threaded in the spark plug opening bushing 17 until the shoulder 27 cooperates with the surface 18 and the crankshaft of the engine is rotated to move the piston 11 upwardly in its cylinder 12. When the piston 11 approaches the upper end of its stroke the piston surface 13 engages the stem head 30 to move the probe stem 21 upwardly. This motion of the stem 21 produces rotation or angular movement of the pointer 43 of the indicator 22. The extreme upper position of the piston 11, that is the upper dead-center position, is indicated by final position of the pointer 43 on the calibrated dial 40. By performing this same operation at the other cylinders of the engine a comparison of the lengths of stroke of the several individual pistons 11 is readily obtained. Should there be any substantial or major difference in the readings provided by the pointer 43 on the dial 40 at any cylinder, the length of the connecting rod in that particular cylinder assembly will be incorrect and steps should be taken to determine the cause of this discrepancy. In a given engine or make and model of engine the probe of the invention may be used to accurately indicate the length of piston stroke and therefore the effective length of the connecting rod. If the probe indicates that a given piston has an excessively short stroke the connecting rod of that piston will usually be found to be bent or otherwise defective. The probe and method provided by the invention for ascertaining the effective and actual piston stroke are useful not only in inspecting new engines but also in determining the condition of old engine or engines that have been in service for some time. It will be observed that the method of the invention does not require disassembly of the engine, modification of the engine in any respect, or any time-consuming operations.

Having described only a typical form of the invention I do not wish to be limited to the specific details herein set forth, but wish to reserve to myself any variations or modifications that may appear to those skilled in the art and fall within the scope of the following claim:

I claim:

A device for indicating movement of a piston in a cylinder having a threaded spark plug opening including a body screwed in said opening, a shoulder on the body engaging the exterior of the cylinder to locate the body, an elongate tubular part on the body extending into the cylinder and having a longitudinally extending slot, a stem slidably guided in the tubular part and having one end protruding from said part to be engaged and moved by the piston, a helical spring arranged around said tubular part to have an end engage against the body, a finger on the other end of the spring extending into said slot and secured to the stem, the spring being under compression to yieldingly urge the stem toward the piston, and said finger serving to prevent angular movement of the stem and being engageable with the ends of said slot to limit axial movement of the stem an indicator on the body at the exterior of the cylinder including a dial occupying a plane substantially parallel with said shoulder, a movable pointer cooperating with the dial, and a mechanism for moving the pointer comprising a movable spring urged rod engaging the other end of the stem and movable upon axial movement of the stem to actuate said mechanism.

References Cited in the file of this patent

UNITED STATES PATENTS

| | | |
|---|---|---|
| 1,683,710 | Zitzman | Sept. 11, 1928 |
| 1,737,726 | Muzyn | Dec. 3, 1929 |
| 1,891,364 | Albertson et al. | Dec. 20, 1932 |
| 2,386,179 | Andrus | Oct. 9, 1945 |

FOREIGN PATENTS

| | | |
|---|---|---|
| 717,978 | France | Oct. 26, 1931 |